(12) United States Patent
Kamo et al.

(10) Patent No.: US 7,962,110 B2
(45) Date of Patent: Jun. 14, 2011

(54) DRIVER CIRCUIT AND TEST APPARATUS

(75) Inventors: Kensuke Kamo, Tokyo (JP); Takashi Sekino, Tokyo (JP); Toshiaki Awaji, Tokyo (JP)

(73) Assignee: Advantest Corporation, Tokyo (JP)

( * ) Notice: Subject to any disclaimer, the term of this patent is extended or adjusted under 35 U.S.C. 154(b) by 686 days.

(21) Appl. No.: 12/030,878

(22) Filed: Feb. 14, 2008

(65) Prior Publication Data

US 2009/0209210 A1    Aug. 20, 2009

(51) Int. Cl.
    *H04B 17/00* (2006.01)
(52) U.S. Cl. ............... 455/115.1; 455/115.2; 455/127.1; 326/30; 324/73.1
(58) Field of Classification Search .............. 455/115.1, 455/115.2, 127.1; 324/765, 770, 73.1; 326/30
    See application file for complete search history.

(56) References Cited

U.S. PATENT DOCUMENTS

| | | | | |
|---|---|---|---|---|
| 5,521,493 A | * | 5/1996 | Persons | 324/158.1 |
| 5,942,922 A | * | 8/1999 | Dinteman et al. | 327/108 |
| 6,292,010 B1 | * | 9/2001 | Persons et al. | 324/765 |
| 7,355,432 B2 | * | 4/2008 | Matsumoto | 324/765 |
| 7,409,615 B2 | * | 8/2008 | Nishimine et al. | 714/734 |
| 7,589,549 B2 | * | 9/2009 | Kamo et al. | 324/765 |
| 7,714,603 B2 | * | 5/2010 | Eldridge et al. | 324/765 |
| 7,755,377 B2 | * | 7/2010 | Kamo et al. | 324/765 |
| 2004/0145375 A1 | * | 7/2004 | Sekino | 324/600 |
| 2009/0128182 A1 | * | 5/2009 | Kamo et al. | 324/765 |

FOREIGN PATENT DOCUMENTS

JP    2002040112    2/2002

\* cited by examiner

*Primary Examiner* — Sanh D Phu
(74) *Attorney, Agent, or Firm* — Jianq Chyun IP Office

(57) ABSTRACT

Provided is a driver circuit that outputs a transmission signal according to a reception signal received from outside, including a first driver that outputs a voltage according to an input first signal; a second driver that receives the voltage output by the first driver as a power supply voltage and outputs the transmission signal according to the power supply voltage and an input second signal; and a control section that delays both the first signal and the second signal, according to a change of the reception signal, and causes the transmission signal according to the reception signal to be output from the second driver.

10 Claims, 8 Drawing Sheets

DRIVER CIRCUIT AND TEST APPARATUS

BACKGROUND

1. Technical Field

The present invention relates to a driver circuit and a test apparatus. In particular, the present invention relates to a driver circuit that outputs a transmission signal according to a reception signal received from outside and a test apparatus that tests a device under test.

2. Related Art

A test apparatus causes a device under test to output a response signal by supplying a test signal having a prescribed waveform to the device under test, such as a semiconductor apparatus, and detecting the output response signal. The test apparatus then makes a judgment concerning pass/fail of the device under test by comparing the detected response signal to an expected value.

The test apparatus transmits the test signal from an apparatus main body to the device under test via a transmission path such as a cable. The transmission path such as a cable, however, causes a high frequency component of the test signal propagating thereon to be deteriorated. In response to this, the test apparatus outputs a test signal having a high frequency component that is enhanced in advance, such that the test signal achieves the desired waveform upon reaching an input end of the device under test (e.g., Japanese Patent Application Publication No. 2002-40112). In U.S. Pat. No. 6,292,010 Specification, a test apparatus in which a voltage buffer and a current buffer can be replaced and connected at an output terminal thereof is recorded.

Here, the test apparatus generates the test signal having the enhanced high frequency component by adding to the waveform of the test signal to be supplied to the device under test an enhancement waveform that represents the high frequency component of the aforementioned waveform. When the timing at which the test apparatus adds the enhancement waveform to the basic waveform is misaligned, a test signal having a waveform different from the desired waveform is supplied to the device under test, so that accurate testing cannot be performed. Furthermore, in a case where a multitude of transistors are connected to an output terminal of the test apparatus in order to add the enhancement waveform to the basic waveform, the test apparatus has an enlarged output capacitance. Because the band is cut due to the slowing of the rising speed (or falling speed) of the test signal when the output capacitance is large, the test apparatus cannot supply the desired waveform to the device under test, and therefore cannot accurately test the device under test.

SUMMARY

Therefore, it is an object of an aspect of the innovations herein to provide a driver circuit and a test apparatus, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary apparatus may include a driver circuit that outputs a transmission signal according to a reception signal received from outside, including a first driver that outputs a voltage according to an input first signal; a second driver that receives the voltage output by the first driver as a power supply voltage and outputs the transmission signal according to the power supply voltage and an input second signal; and a control section that changes both the first signal and the second signal, according to a change of the reception signal, so that the second driver outputs the transmission signal according to the reception signal.

According to a second aspect related to the innovations herein, one exemplary apparatus may include a test apparatus that tests a device under test, including a test signal supply section that supplies a test signal to the device under test, an acquiring section that acquires a response signal output by the device under test in response to the test signal, and a judgment section that makes a judgment concerning pass/fail of the device under test based on a result of a comparison between the response signal and an expected value. In the test apparatus, the test signal supply section includes a pattern generating section that generates a test pattern for testing the device under test and a driver circuit that outputs the test signal according to the test pattern. Furthermore, in the test apparatus, the driver circuit includes a first driver that outputs a voltage according to an input first signal; a second driver that receives the voltage output by the first driver as a power supply voltage and outputs the test signal according to the power supply voltage and an input second signal; and a control section that changes both the first signal and the second signal, according to a change of the test pattern, so that the second driver outputs the test signal according to the test pattern.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
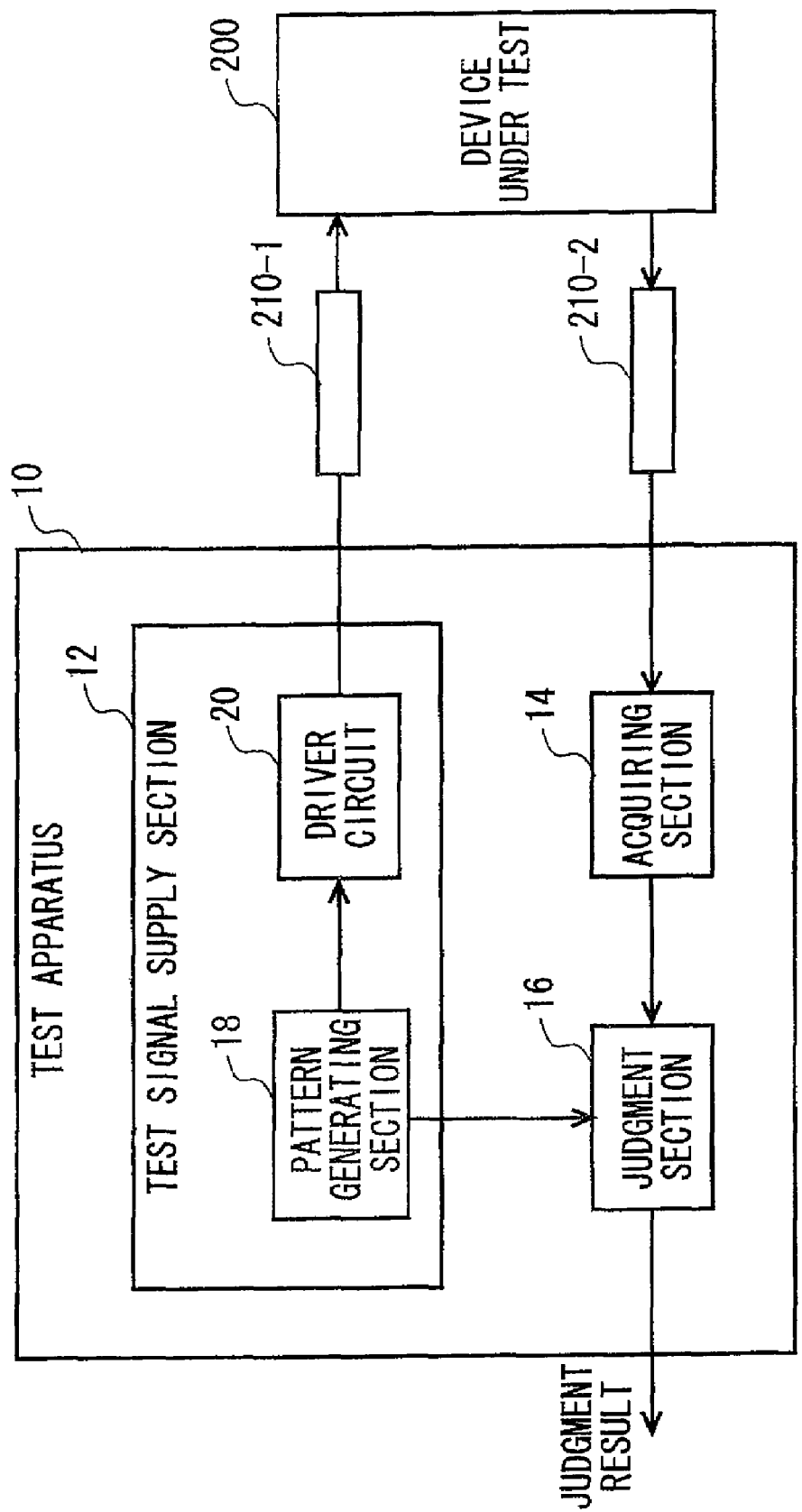
FIG. 1 shows the test apparatus 10 according to the present embodiment together with a device under test 200.

FIG. 1 shows a test apparatus 10 according to the present embodiment together with a device under test 200. The test apparatus 10 tests the device under test 200. The test apparatus 10 is provided with a test signal supply section 12, an acquiring section 14, and a judgment section 16.

The test signal supply section 12 supplies a test signal to the device under test 200. The test signal supply section 12 includes a pattern generating section 18 and a driver circuit 20.

The pattern generating section 18 generates a test pattern for testing the device under test 200. The pattern generating section 18 generates, for example, a test pattern indicating a logic value (e.g., logic H or logic L) of the test signal to be supplied to the device under test 200. The pattern generating section 18 also generates an expected value that indicates a response signal to be output from the device under test 200. The driver circuit 20 outputs the test signal having a waveform according to the test pattern generated by the pattern generating section 18.

The acquiring section 14 acquires the response signal output by the device under test 200 in response to the test signal. The judgment section 16 makes a judgment concerning pass/fail of the device under test 200 based on a result of a comparison between the response signal and the expected value.

The test apparatus 10 described above is connected to the device under test 200 via a transmission path 210-1 such as a cable and/or wiring on a substrate. The test signal output by the driver circuit 20 is supplied to the device under test 200 via a transmission path 210. Furthermore, the response signal output by the device under test 200 is supplied to the acquiring section 14 via a transmission path 210-2.

Figure 2:
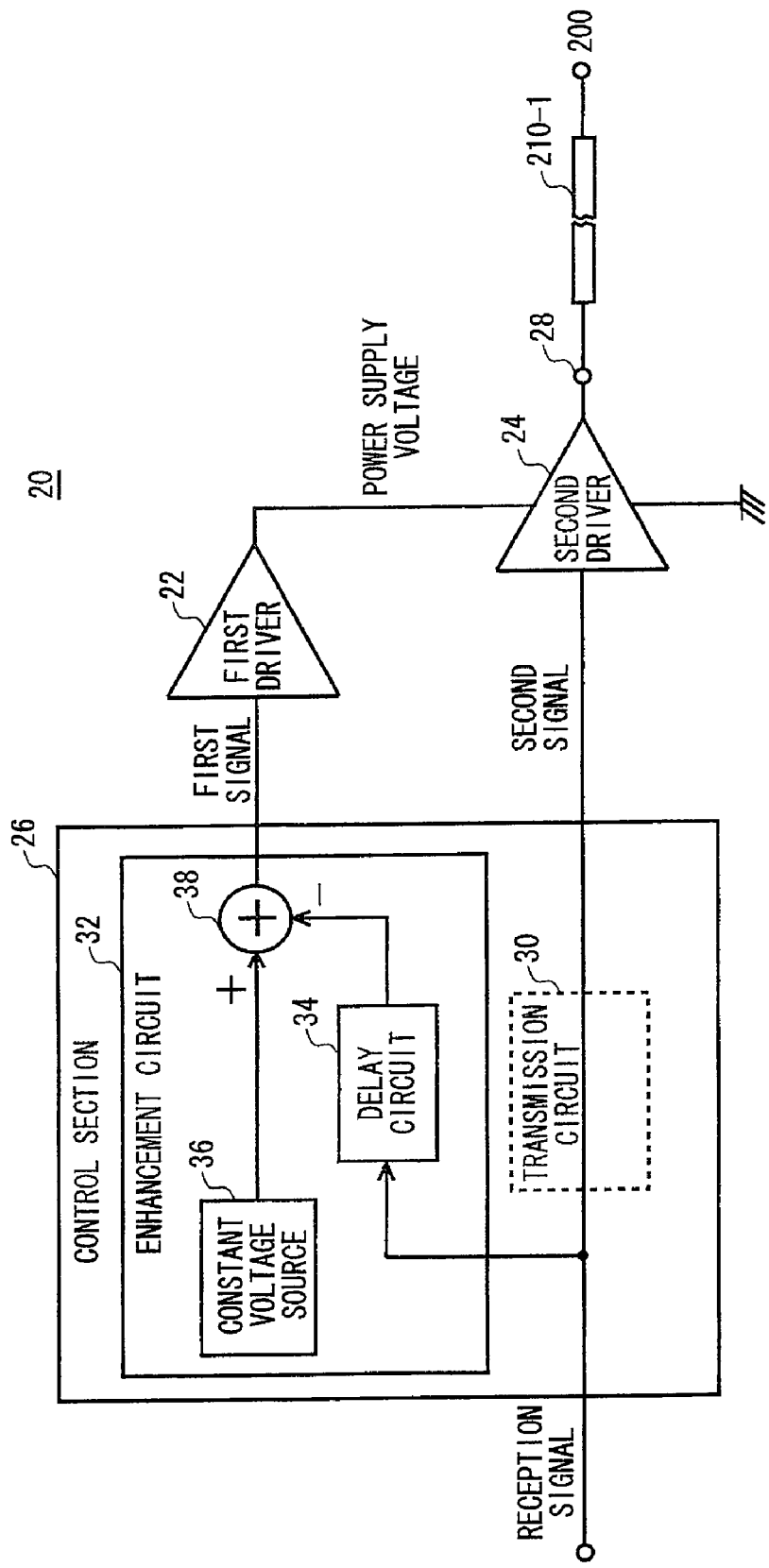
FIG. 2 shows the driver circuit 20 according to the present invention together with a transmission path 210.

FIG. 2 shows the driver circuit 20 according to the present invention together with the transmission path 210. The driver circuit 20 outputs a transmission signal (in the present embodiment, a test signal) having a voltage waveform according to a reception signal (in the present embodiment, a test pattern indicating logic H or logic L) received from the outside.

The driver circuit 20 is provided with a first driver 22, a second driver 24, and a control section 26. The first driver 22 outputs a voltage corresponding to an input first signal. The power output by the first driver 22 may be greater than the power output by the second driver 24. The first driver may be an amplification circuit having a configuration in which a power amplifier is provided at an output stage thereof, for example.

The second driver 24 receives the voltage output by the first driver 22 as the power supply voltage. The second driver 24 outputs the transmission signal according to the power supply voltage and the input second signal. The switching speed of the second driver 24 is faster than that of the first driver 22. The second driver 24 may be a differential amplification circuit, for example.

An output terminal 28 of the second driver 24 is connected to an input terminal of an external circuit (in the present embodiment, an input terminal of the device under test 200) via the transmission path 210. The first driver 22, according to the first signal, changes the power supply voltage supplied to the second driver 24 in a manner to enhance an edge of a rectangular wave output from the second driver 24, thereby causing the second driver 24 to output a transmission signal in which waveform distortion caused by the transmission path 210 is compensated in advance.

The control section 26 generates the first signal and a second signal according to the reception signal. The control section 26 supplies the first signal to the first driver 22 and supplies the second signal to the second driver 24.

Here, the control section 26 changes both the first signal and the second signal according to a change in the reception signal, so that a transmission signal dependent on the reception signal is output from the second driver 24. More specifically, the control section 26 generates the second signal to be such that the transmission signal having a voltage waveform dependent on the reception signal is output from the second driver 24. Furthermore, the control section 26 generates the first signal that causes the second driver 24 to output a power supply voltage that enhances the edge of the voltage waveform of the transmission signal to be output.

The control section 26 may include a transmission circuit 30 and an enhancement circuit 32, for example. The transmission circuit 30 supplies to the second driver 24, as the second signal, a signal whose level changes in a direction that is the same as the direction in which the level of the reception signal changes. For example, the transmission circuit 30 outputs the second signal whose level increases in accordance with a rising edge from logic L to logic H of the reception signal, and whose level decreases in accordance with a falling edge from logic H to logic L of the reception signal. The transmission circuit 30 may be a transmission line that supplies the supplied reception signal in an unaltered manner to the input end of the second driver 24.

The enhancement circuit 32 supplies to the first driver 22, as the first signal, a signal whose level changes in a direction that is the opposite of the direction in which the level of the reception signal changes. When supplied with the edge of a rectangular wave, the enhancement circuit 32 supplies the first driver 22 with the first signal whose level changes gradually in comparison to the change of the voltage output by the second driver 24. For example, the enhancement circuit 32 outputs the first signal whose level gradually decreases in the rising edge during which the reception signal changes from logic L to logic H, and whose level gradually increases in the falling edge during which the reception signal changes from logic H to logic L. The enhancement circuit 32 may output the first signal whose level begins changing at a time occurring a prescribed amount of time after the level of the reception signal begins changing, for example.

The enhancement circuit 32 may include a delay circuit 34, a constant voltage source 36, and a subtraction circuit 38, for example. The delay circuit 34 outputs a signal whose level changes gradually in a direction that is the same as the direction in which the level of the reception signal changes. Furthermore, the delay circuit 34 outputs a signal whose level begins changing at a time occurring a prescribed amount of time after the level of the reception signal changes. The delay circuit 34 may output a signal obtained by low-pass filtering the reception signal.

It should be noted that the prescribed time by which the delay circuit 34 delays the signal may be zero. In other words, the delay circuit 34 may output a signal whose level begins changing at the same time at which the level of the reception signal begins changing.

The constant voltage source 36 outputs a signal having a prescribed level. The subtraction circuit 38 subtracts the signal output by the delay circuit 34 from the signal output by the constant voltage source 36, and supplies the thus obtained signal to the first driver 22 as the first signal. The enhancement circuit 32 described above can supply the first driver 22 with the first signal whose level changes gradually in a direction opposite the direction in which the level of the reception signal changes.

Figure 3:
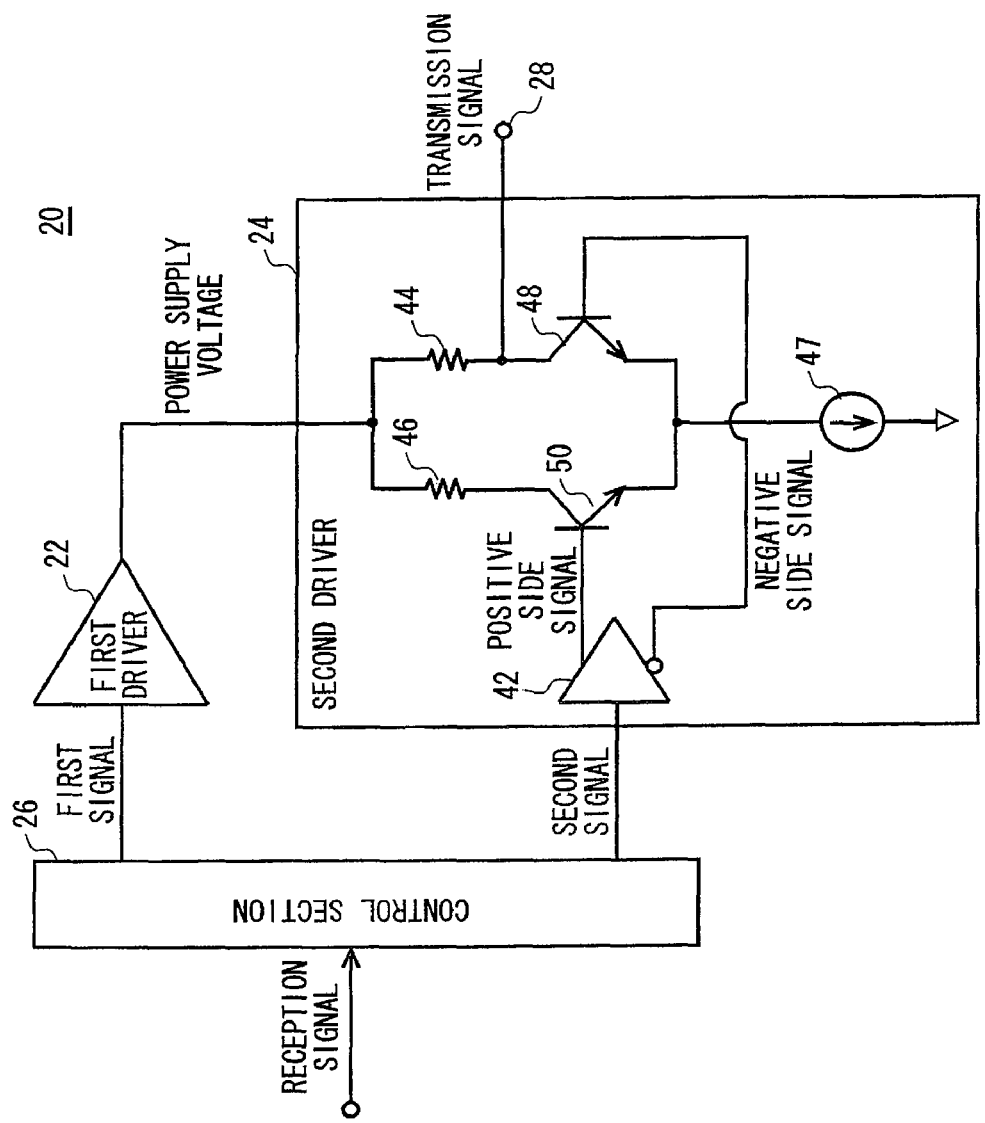
FIG. 3 shows an exemplary configuration of the second driver 24 according to the present embodiment together with the first driver 22 and the control section 26.

FIG. 3 shows an exemplary configuration of the second driver 24 according to the present embodiment together with the first driver 22 and the control section 26. The second driver 24 may be a differential amplification circuit having a response speed that is faster than that of the first driver 22.

The second driver 24 may include a differential buffer 42, an output resistor 44, a differential resistor 46, a current source 47, an output switch 48, and a differential switch 50, for example. The differential buffer 42 outputs a differential signal according to the supplied second signal. More specifically, the differential buffer 42 outputs a positive-side signal indicating the same logic value as the second signal and a negative-side signal indicating an inverse logic value of the second signal.

The output resistor 44 is disposed between the output end of the first driver 22 and the output terminal 28 of the second driver 24. More specifically, the output resistor 44 has one end connected to the output end of the first driver 22 and has the other end connected to the output terminal 28 of the second driver 24. The differential resistor 46 has the same resistance value as the output resistor 44 and has one end connected to the output end of the first driver 22. The current source 47 causes a constant current to flow to the common potential.

The output switch 48 is connected between the current source 47 and the end of the output resistor 44 that is not connected to the first driver 22 (in other words, the output terminal 28 of the second driver 24). The output switch 48 is turned on or off according to the logic of the negative-side signal. The output switch 48 may be a transistor having the collector connected to the other end of the output resistor 44, the emitter connected to the current source 47, and the base provided with the negative-side signal, for example.

The differential switch 50 is disposed between the current source 47 and the other end of the differential resistor 46 (the end which is not connected to the first driver 22). The differential switch 50 is turned on or off according to the logic of the positive-side signal. The differential switch 50 may be the same type of transistor as the output switch 48, and may have the collector connected to the other end of the differential resistor 46, the emitter connected to the current source 47, and the base supplied with the positive-side signal.

When one of either the output switch 48 or the differential switch 50 is turned on, the other is turned off. For example, when the reception signal is logic L, the output switch 48 is turned on and the differential switch 50 is turned off, and when the reception signal is logic H, the output switch 48 is turned off and the differential switch 50 is turned on. Accordingly, the output switch 48 and the differential switch 50 can switch between causing a constant current to flow to the output resistor 44 or not, according to the second signal.

In the second driver 24 described above, the output switch 48 is turned off when the second signal is logic H, so that a voltage drop is not caused by the output resistor 44 because the current does not flow to the output resistor 44. Accordingly, the second driver 24 can output an output voltage (power supply voltage) of the first driver 22 from the output terminal 28 when the second signal is logic H.

Furthermore, in the second driver 24 described above, the output switch 48 is turned on when the second signal is logic L, so that a voltage drop is caused by the output resistor 44 because the constant current flows to the output resistor 44. Accordingly, the second driver 24 can output, from the output terminal 28, a voltage obtained by subtracting the voltage drop caused by the output resistor 44 from the output voltage (power supply voltage) of the first driver 22 when the second signal is logic L.

Figure 4:
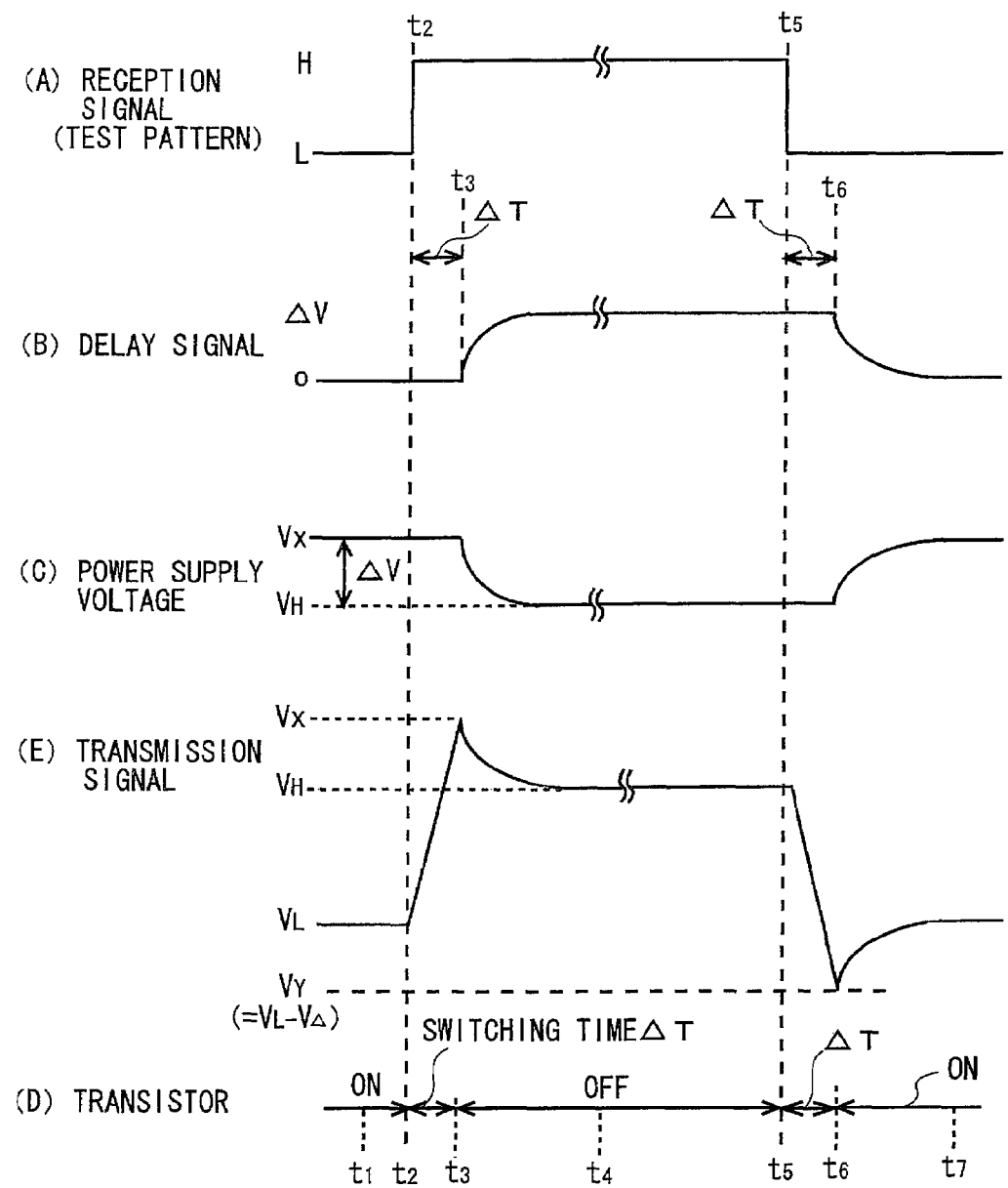
FIG. 4 shows an example of the signals flowing in the driver circuit 20 that includes the control section 26 having the configuration shown in FIG. 2 and the second driver 24 having the configuration shown in FIG. 3.

FIG. 4 shows an example of the signals flowing in the driver circuit 20 that includes the control section 26 having the configuration shown in FIG. 2 and the second driver 24 having the configuration shown in FIG. 3. In FIG. 4, (A) shows an example of the reception signal (test pattern). In the present embodiment, the reception signal changes from logic L to logic H at time t2 and changes from logic L to logic H at time t5.

In FIG. 4, (B) shows an example of the signal (delay signal) output by the delay circuit 34 shown in FIG. 2. In the present embodiment, the delay circuit 34 outputs a voltage of zero volts at a time when the reception signal is logic L. The delay circuit 34 outputs a gradually increasing voltage from a time t3, which is a time $\Delta T$ later than the time t2. The time $\Delta T$ may be a switching time of the output switch 48 shown in FIG. 3, for example. The delay circuit 34 outputs a voltage of $\Delta V$ volts at a time t4 at which the reception signal is logic H.

Next, the delay circuit 34 outputs a voltage that gradually decreases from a time t6, which is a time occurring after the time t5 by a time of $\Delta T$. The delay circuit 34 outputs a voltage of zero volts at a time t7 at which the reception signal is logic H.

In FIG. 4, (C) shows an example of the power supply voltage output by the by the first driver 22 shown in FIG. 3. In the present embodiment, the first driver 22, at the time t1, outputs a power supply voltage of $V_X$ volts ($V_X = V_H + \Delta V$), obtained by adding $\Delta V$ volts to the H side voltage ($V_H$ volts), which is the reference voltage of the logic H side. The first driver 22 outputs a power supply voltage that gradually decreases from the time t3. At the time t4, the first driver 22 outputs the power supply voltage that is the H side voltage ($V_H$ volts).

The first driver 22 then outputs a power supply voltage that gradually increases from the time t6. At time t7, the first driver 22 outputs a power supply voltage of $V_X$ volts.

In FIG. 4, (D) shows an exemplary switching performance of the output switch 48 shown in FIG. 3. In the present embodiment, the output switch 48 is turned on at the time t1. The output switch 48 begins changing from on to off at the time t2 and completes the transition at the time t3 to be turned off.

The output switch 48 is turned off at the time t4. The output switch 48 begins changing from off to on at the time t5 and completes the transition at the time t6 to be turned on. The output switch 48 is turned on at the time t7.

In FIG. 4, (E) shows an example of the voltage of the transmission signal output by the second driver 24 shown in FIG. 3. In the present embodiment, the second driver 24 outputs an L side voltage ($V_L$), which is the reference voltage of the logic L side, at the time t1. Here, the L side voltage $V_L$ is a voltage obtained by subtracting from $V_X$ volts a voltage drop caused by the output resistor 44 (the resistance value of the output resistor 44 multiplied by the constant current flowing to the current source 47).

The second driver 24 begins increasing the voltage at the time t2. The second driver 24 quickly increases the voltage until the voltage reaches the $V_X$ which is greater than the H side voltage ($V_H$). Next, the second driver 24 gradually decreases the voltage from the time t3. At the time t4, the second driver 24 outputs a voltage that remains stable at $V_H$ volts.

In the manner described above, the second driver 24 can output a rising edge formed in a peak waveform that exceeds the H side voltage ($V_H$). Therefore, by using the second driver

24, a transmission signal having a voltage waveform in which the rising edge is enhanced can be output.

Next, at the time t5, the second driver 24 begins to decrease the voltage. The second driver 24 quickly decreases the voltage until the voltage falls to V$_Y$(=V$_L$-ΔV), which is below the L side voltage (V$_L$). The second driver 24 then gradually increases the voltage from the time t6. At the time t7, the second driver 24 outputs a voltage that is stabilized at V$_L$ volts.

In this manner, the second driver 24 can output a falling edge formed in a peak waveform that falls below the L side voltage (V$_L$). Therefore, by using the second driver 24, a transmission signal having a voltage waveform in which the falling edge is enhanced can be output.

In the manner described above, the second driver 24 changes the output voltage in accordance with the change of the second signal. After the voltage output by the second driver 24 is changed according to the change of the second signal, the first driver 22 changes the power supply voltage such that the output voltage changes gradually in comparison to the change of the output voltage of the second driver 24 according to the change of the second signal, and such that the output voltage changes in a direction that is opposite the direction in which the output voltage of the second driver 24 changes according to the change of the second signal.

More specifically, when the reception signal changes in a first direction (e.g., from logic L to logic H), the second driver 24 increases the output voltage to output a rising edge of the transmission signal. When the reception signal changes in the first direction (e.g., from logic L to logic H), the first driver 22, after the second driver 24 outputs the rising edge of the transmission signal, decreases the power supply voltage such that the output voltage decreases gradually in comparison to the increase of the output voltage of the rising edge.

Furthermore, when the reception signal changes in a second direction (e.g., from logic H to logic L), the second driver 24 decreases the output voltage to output a rising edge of the transmission signal. When the reception signal changes in the second direction (e.g., from logic H to logic L), the first driver 22, after the second driver 24 outputs the falling edge of the transmission signal, increases the power supply voltage such that the output voltage increases gradually in comparison to the decrease of the output voltage of the falling edge. Therefore, by using the driver circuit 20, the transmission signal can be output in which the waveform distortion caused by the transmission path 210 is compensated in advance.

Figure 5:
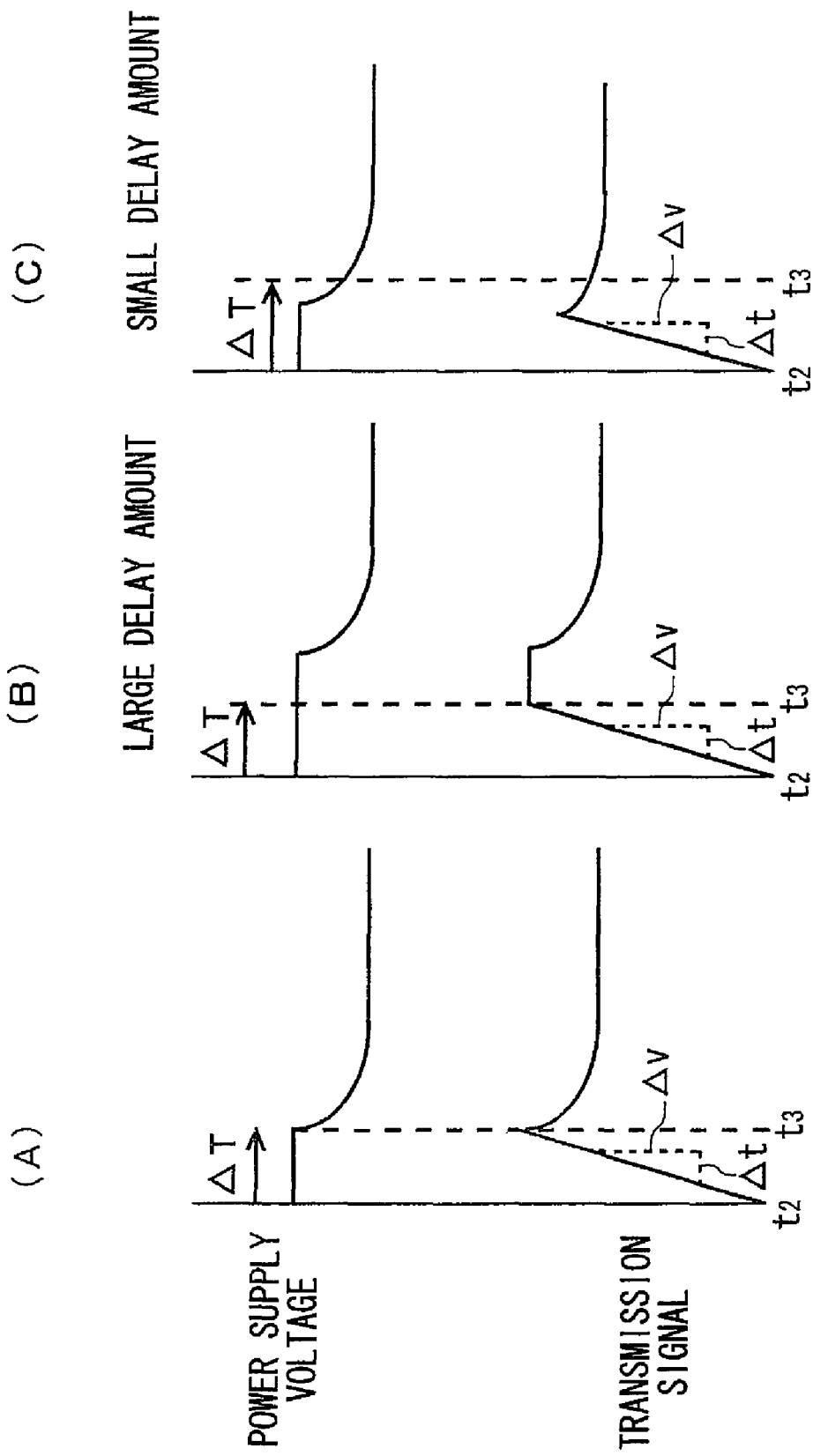
FIG. 5 shows waveforms of the power supply voltage of the second driver 24 delayed by differing delay amounts, together with voltage waveforms of the transmission signal output by the first driver 22 that is provided with the waveforms of the thus delayed power supply voltage.

FIG. 5 shows waveforms of the power supply voltage of the second driver 24 delayed by differing delay amounts, together with voltage waveforms of the transmission signal output by the first driver 22 that is provided with the waveforms of the thus delayed power supply voltage. As shown by (A) in FIG. 5, the first driver 22 outputs a power supply voltage that begins to decrease at the time t3, which is a time occurring after a time ΔT has passed since the time at which the reception signal changes (time t2), for example. In such a case, the second driver 24 outputs a transmission signal having a waveform that peaks at the time t3.

Here, as an example shown in (B) of FIG. 5, an error occurs in the delay time, so that the first driver 22 outputs a power supply voltage that begins to decrease at a time later than the time t3. In such a case, the second driver 24 outputs a transmission signal having a waveform that peaks at a time later than the time t3. Even in such a case, however, the rising speed of the transmission signal (Δv/Δt) is the same as the rising speed of the transmission signal shown in (A) of FIG. 5.

As another example, as shown in (C) of FIG. 5, an error occurs in the delay circuit 34, so that the first driver 22 outputs a power supply voltage that begins to decrease at a time earlier than the time t3. In such a case, the second driver 24 outputs a transmission signal having a waveform that peaks at a time earlier than the time t3. Even in such a case, however, the rising speed of the transmission signal (Δv/Δt) is the same as the rising speed of the transmission signal shown in (A) of FIG. 5.

In the manner described above, in the test apparatus 10 according to the present embodiment, the rising (or falling) speed of the transmission signal does not change in a case where an error occurs in the decreasing timing (or increasing timing) of the power supply voltage output by the first driver 22. Accordingly, by using the test apparatus 10, a transmission signal (test signal) can be output onto which is accurately superimposed an enhancement waveform that enhances the high frequency component. Therefore, by using the test apparatus 10, a transmission signal (test signal) having the desired waveform can be supplied to the input terminal of the external circuit (device under test 200), even when the high frequency component of the test signal deteriorates in the transmission path 210.

Figure 6:
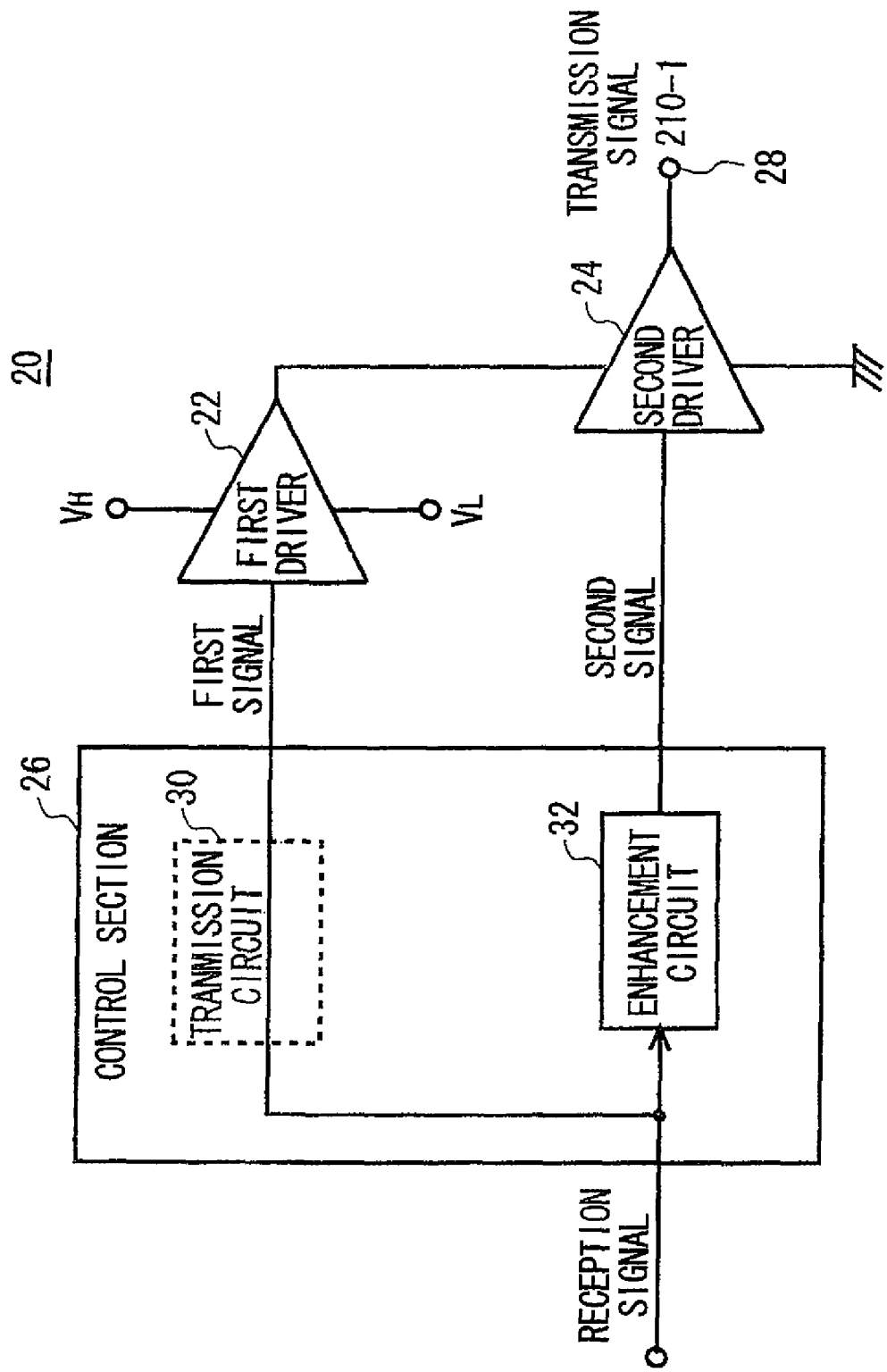
FIG. 6 shows a configuration of the driver circuit 20 according to a first modification of the present embodiment.

FIG. 6 shows a configuration of the driver circuit 20 according to a first modification of the present embodiment. The driver circuit 20 of the present modification has the same configuration and function as that of the driver circuit 20 shown in FIG. 2, and therefore the same reference numerals are given to components having the same configuration and function as that of the components provided to the driver circuit 20 shown in FIG. 2, and the following description omits all but differing points.

In the present modification, the first driver 22 outputs the H side voltage (V$_H$) or the L side voltage (V$_L$), according to the logic value of the first signal. For example, when the logic value of the first signal is logic H, the first driver 22 outputs the H side voltage (V$_H$ volts). Furthermore, when the logic value of the first signal is logic L, the first driver 22 outputs the L side voltage (V$_L$ volts), for example.

In the present modification, the second driver 24 may be a differential amplification circuit that receives, as the power supply voltage, a voltage output from the first driver 22. The second driver 24 may have the same configuration as that of the second driver 24 shown in FIG. 3, for example.

The control section 26 includes the transmission circuit 30 and the enhancement circuit 32. The transmission circuit 30 supplies to the first driver 22, as the first signal, a signal whose level changes in the same direction in which the level of the reception signal changes. The transmission circuit 30 may be a transmission line that supplies the reception signal to the first driver 22 in an unaltered manner.

When the level of the reception signal changes, the enhancement circuit 32 generates an enhancement signal that enhances the edge of the reception signal. The enhancement circuit 32 supplies the generated enhancement signal to the second driver 24 as the second signal. The enhancement circuit 32 may generate the enhancement signal by high-pass filtering the reception signal, for example.

Figure 7:
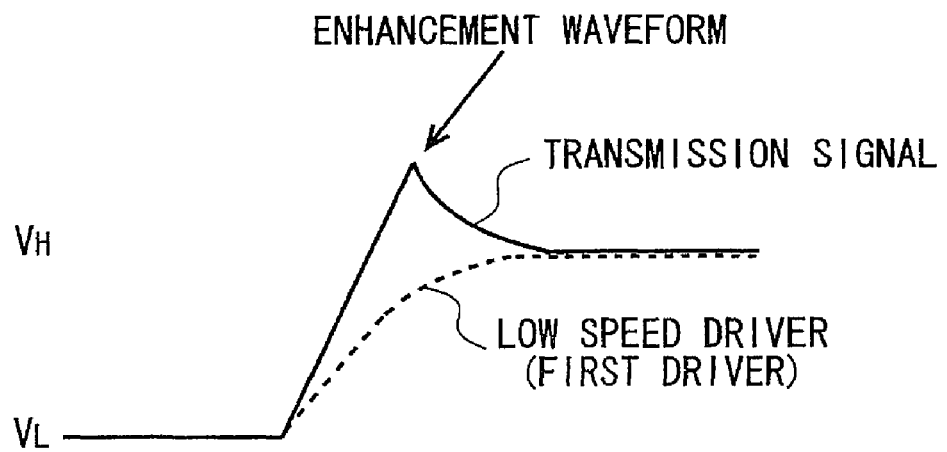
FIG. 7 shows an example of a waveform of the transmission signal output from the driver circuit 20 shown in FIG. 6.

FIG. 7 shows an example of a waveform of the transmission signal output from the driver circuit 20 shown in FIG. 6. The first driver 22 having the configuration shown in FIG. 6, according to the first signal, changes the power supply voltage supplied to the second driver 24 such that a rectangular wave is output from the second driver 24. More specifically, when the first signal changes, the first driver 22 changes the output voltage of the second driver 24 by changing the power supply voltage supplied to the second driver 24, and causes the second driver 24 to output the edge of the transmission signal. Here, because the response speed of the first driver 22 is relatively slow, a rectangular wave with a sloping edge is output from the second driver 24, as shown by the dotted line of FIG. 7.

The second driver 24 outputs a transmission signal in which the waveform distortion caused by the transmission path 210 is compensated in advance, by changing the output voltage according to the second signal, which causes the enhancement waveform that enhances the edge of the rectangular wave to be output from the second driver 24, and the power supply voltage supplied from the first driver 22. In other words, the second driver 24 changes the output voltage according to the supplied power supply voltage and the second signal, which causes the output voltage to change in the same direction as the change of the output voltage corresponding to the change of the supplied power supply voltage. It should be noted that, because the response speed of the second driver 24 is relatively fast, the edge of the transmission signal is changed quickly, as shown by the solid line of FIG. 7.

The driver circuit 20 described above can output the transmission signal in which the enhancement waveform that enhances the edge of the rectangular wave is superimposed thereon. Therefore, by using the driver circuit 20, the transmission signal can be output in which the waveform distortion caused by the transmission path 210 is compensated in advance.

Figure 8:
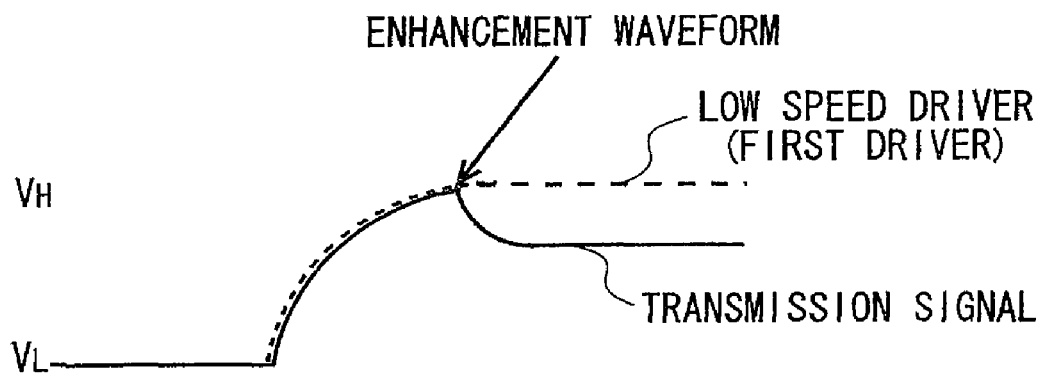
FIG. 8 shows another example of a waveform of the transmission signal output from the driver circuit 20 shown in FIG. 6.

FIG. 8 shows another example of a waveform of the transmission signal output from the driver circuit 20 shown in FIG. 6. Instead of high-pass filtering the reception signal, the enhancement circuit 32 may generate an enhancement signal whose level changes in a direction opposite the direction in which the level of the reception signal changes, from a time that is a prescribed amount of time later than the time at which the level of the reception signal begins to change. For example, the enhancement circuit 32 may generate the enhancement signal by low-pass filtering a signal obtained by inverting the reception signal, from the time that is the prescribed amount of time later than the time at which the level of the reception signal changes.

The driver circuit 20 having the configuration described above can output the transmission signal whose voltage gradually changes in a direction opposite the original direction of change, after a prescribed amount of time has passed since the voltage began to change, as shown in FIG. 8. In other words, the second driver 24 can output the transmission signal having a waveform in which the voltage gradually decreases after increasing in the rising edge and in which the voltage gradually increases after quickly decreasing in the falling edge. Therefore, the second driver 24 can compensate the waveform distortion caused by the transmission path 210 by superimposing an enhancement waveform having an enhanced edge onto the edge of the rectangular wave.

Figure 9:
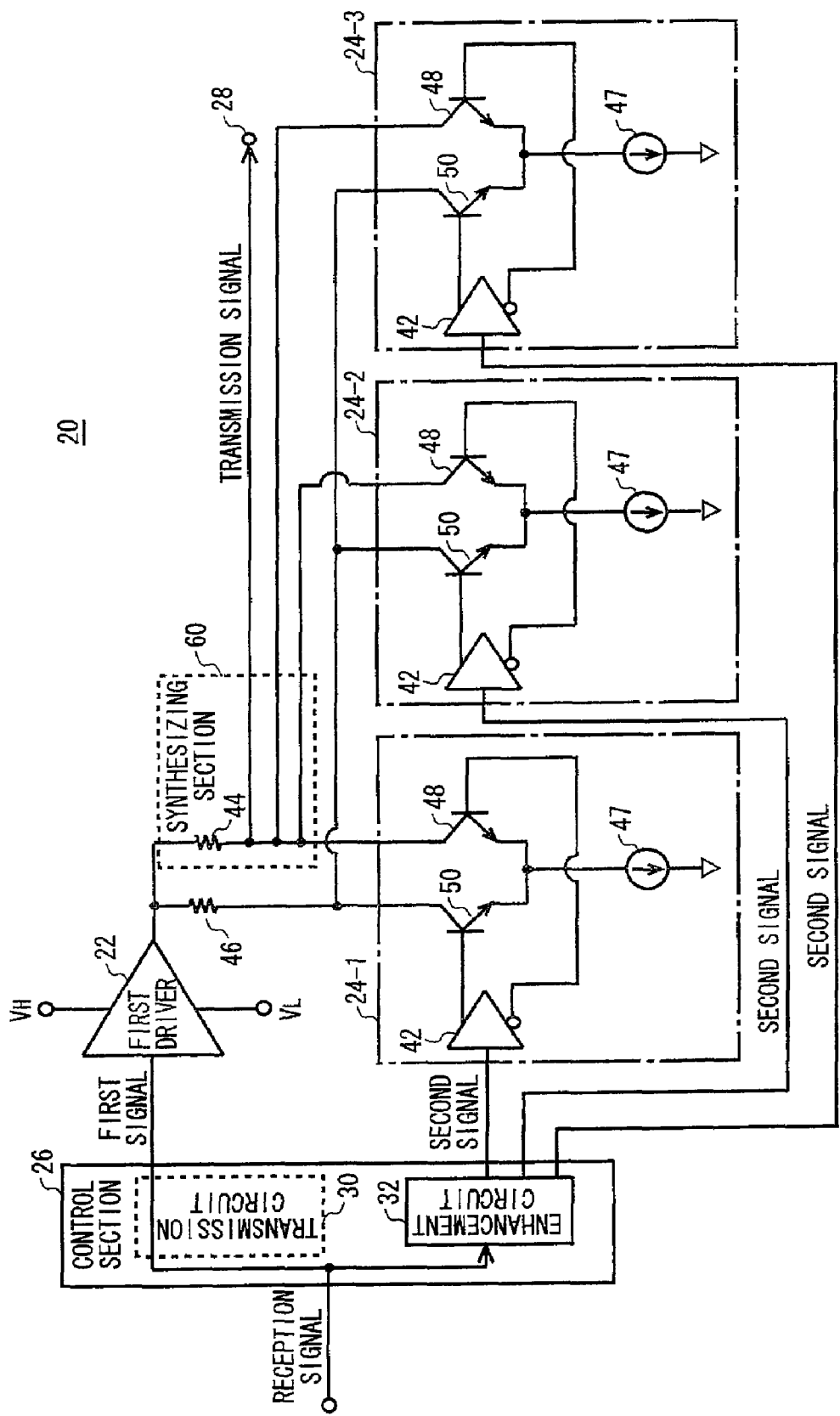
FIG. 9 shows a configuration of the driver circuit 20 according to a second modification of the present embodiment.

FIG. 9 shows a configuration of the driver circuit 20 according to a second modification of the present embodiment. The driver circuit 20 according to the present modification adopts substantially the same configuration and function as that of the driver circuit 20 shown in FIG. 6, and therefore the same reference numerals are given to components having the same configuration and function as that of the components provided to the driver circuit 20 shown in FIG. 6, and the following description omits all but differing points.

The driver circuit 20 according to the present modification is provided with a plurality of second drivers 24 (24-1, 24-2, 24-3). The driver circuit 20 according to the present modification is further provided with a synthesizing section 60.

Each of the plurality of second drivers 24 may be a differential amplification circuit that is the same as the second driver 24 shown in FIG. 3, for example. In such a case, the output resistor 44 and the differential resistor 46 each provide a single resistance in common to each of the plurality of second drivers 24.

The synthesizing section 60 generates a transmission signal obtained by synthesizing the output voltages of the plurality of second drivers 24. The synthesizing section 60 outputs the transmission signal to the outside via the output terminal 28. In a case where each of the plurality of second drivers 24 is a differential amplification circuit, the provided output resistor 44 functions as the synthesizing section 60.

In the present modification, the control section 26 changes the first signal and the plurality of second signals according to the change of the reception signal, and causes the transmission signal obtained by synthesizing the outputs of the plurality of second drivers 24 to be output from the second drivers 24. For example, when the level of the reception signal changes, the enhancement circuit 32 in the control section 26 generates a plurality of enhancement signals that enhance the edge of the reception signal with waveforms that are different from one another. The enhancement circuit 32 supplies the plurality of generated enhancement signals to the plurality of second drivers 24, respectively, as the second signal. The enhancement circuit 32 may generate the plurality of enhancement signals by high-pass filtering the reception signal with constants differing from one another.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A driver circuit that outputs a transmission signal according to a reception signal received from outside, comprising:
a first driver that outputs a voltage according to an input first signal;
a second driver, an output terminal of which is connected to an input terminal of an external circuit via a transmission path, that receives the voltage output by the first driver as a power supply voltage and outputs the transmission signal according to the power supply voltage and an input second signal, an edge of a rectangular wave in the transmission signal being enhanced and waveform distortion caused by the transmission path being compensated in advanced; and
a control section that changes both the first signal and the second signal, according to a change of the reception signal, so that the second driver outputs the transmission signal according to the reception signal.

2. The driver circuit according to claim 1, wherein the second driver has a switching speed that is faster than that of the first driver.

3. The driver circuit according to claim 2, wherein
the first driver changes the power supply voltage supplied to the second driver, according to the first signal, in a manner to enhance the edge of the rectangular wave output from the second driver, so that the second driver outputs the transmission signal in which the waveform distortion caused by the transmission path is compensated in advance.

4. The driver circuit according to claim 3, wherein
the second driver changes an output voltage, according to a change of the second signal, and
the first driver, after the output voltage of the second driver has been changed according to the change of the second signal, changes the power supply voltage such that the output voltage of the second driver changes gradually in comparison to the change of the output voltage of the second driver according to the change of the second signal and changes in an opposite direction of the change of the output voltage of the second driver according to the change of the second signal.

5. The driver circuit according to claim 4, wherein
the second driver, in a case where the reception signal changes in a first direction, increases the output voltage to output a rising edge of the transmission signal, and
the first driver, in a case where the reception signal changes in the first direction, and at a time after the second driver has output the rising edge of the transmission signal, decreases the power supply voltage such that the output voltage decreases gradually in comparison to the increase of the output voltage in the rising edge.

6. The driver circuit according to claim 2, wherein
the first driver changes the power supply voltage supplied to the second driver, according to the first signal, so that the second driver outputs the rectangular wave, and
the second driver changes an output voltage, according to the supplied power supply voltage and the second signal, which causes the second driver to output an enhancement waveform that enhances the edge of the rectangular wave, so as to output the transmission signal in which the waveform distortion caused by the transmission path is compensated in advance.

7. The driver circuit according to claim 6, wherein
the first driver, when the first signal changes, changes the output voltage of the second driver by changing the power supply voltage supplied to the second driver, so that the second driver outputs an edge of the transmission signal, and
the second driver changes the output voltage, according to the supplied power supply voltage and the second signal, which causes the output voltage to change in a direction that is the same as a direction of the change of the output voltage according to the change of the supplied power supply voltage.

8. A driver circuit that outputs a transmission signal according to a reception signal received from outside, comprising:
a first driver that outputs a voltage according to an input first signal;
a second driver that receives the voltage output by the first driver as a power supply voltage and outputs the transmission signal according to the power supply voltage and an input second signal; and
a control section that changes both the first signal and the second signal, according to a change of the reception signal, so that the second driver outputs the transmission signal according to the reception signal,
wherein the second driver includes:
an output resistor that is disposed between an output end of the first driver and an output terminal of the second driver; and
an output switch that switches whether a constant current flows to the resistor, according to the second signal.

9. The driver circuit according to claim 1, comprising a plurality of second drivers, wherein
the control section changes the first signal and a plurality of second signals, according to the change of the reception signal, and the second driver outputs the transmission signal obtained by synthesizing outputs of the plurality of second drivers.

10. A test apparatus that tests a device under test, comprising:
a test signal supply section that supplies a test signal to the device under test;
an acquiring section that acquires a response signal output by the device under test in response to the test signal; and
a judgment section that makes a judgment concerning pass/fail of the device under test based on a result of a comparison between the response signal and an expected value, wherein
the test signal supply section includes,
a pattern generating section that generates a test pattern for testing the device under test; and
a driver circuit that outputs the test signal according to the test pattern, and
the driver circuit includes,
a first driver that outputs a voltage according to an input first signal;
a second driver that receives the voltage output by the first driver as a power supply voltage and outputs the test signal according to the power supply voltage and an input second signal; and
a control section that changes both the first signal and the second signal, according to a change of the test pattern, so that the second driver outputs the test signal according to the test pattern.

* * * * *